US009646458B2

(12) United States Patent
Zielinski

(10) Patent No.: US 9,646,458 B2
(45) Date of Patent: May 9, 2017

(54) GAMING SYSTEM, GAMING DEVICE AND METHOD HAVING SECONDARY SYMBOLS ASSOCIATED WITH PRIMARY SYMBOLS

(75) Inventor: John H. Zielinski, Reno, NV (US)

(73) Assignee: IGT, Las Vegas, NV (US)

( * ) Notice: Subject to any disclaimer, the term of this patent is extended or adjusted under 35 U.S.C. 154(b) by 1297 days.

(21) Appl. No.: 12/184,688

(22) Filed: Aug. 1, 2008

(65) Prior Publication Data

US 2010/0029364 A1 Feb. 4, 2010

(51) Int. Cl.
*A63F 9/24* (2006.01)
*A63F 13/00* (2014.01)
*G07F 17/32* (2006.01)

(52) U.S. Cl.
CPC .......... *G07F 17/3244* (2013.01); *G07F 17/32* (2013.01)

(58) Field of Classification Search
CPC ............. G07F 17/3258; G07F 17/3267; G07F 17/3262; G07F 17/3265; G07F 17/326; G07F 17/3213; G07F 17/32; G07F 17/3244; G07F 17/3225; G07F 17/323; G07F 17/3237; G07F 17/3256
USPC ... 463/16, 20, 25, 26–32, 40–42, 43, 11–13, 463/17–19
See application file for complete search history.

(56) References Cited

U.S. PATENT DOCUMENTS 1,978,395 A 10/1934 Groetchen
3,420,525 A 1/1969 Waders
3,642,287 A 2/1972 Lally et at.
3,735,987 A 5/1973 Ohki
4,410,178 A 10/1983 Partridge
4,448,419 A 5/1984 Telnaes
4,695,053 A 9/1987 Vazquez, Jr. et al.
4,756,531 A 7/1988 DiRe et al.
4,836,546 A 6/1989 DiRe et al.
4,871,171 A 10/1989 Rivero
5,019,973 A 5/1991 Wilcox et al.
5,098,107 A 3/1992 Boylan et al.
5,152,529 A 10/1992 Okada
5,205,555 A 4/1993 Hamano
5,259,616 A 11/1993 Bergmann
5,282,633 A 2/1994 Boylan et al.
5,308,065 A 5/1994 Bridgeman et al.
5,332,219 A 7/1994 Marnell, II et al.
(Continued)

FOREIGN PATENT DOCUMENTS

AU 199716432 B2 9/1997
AU 199717601 B2 9/1997
(Continued)

OTHER PUBLICATIONS

"The Silicon Gaming Odyssey Slot Machine," by Levinthal, et al., IEEE Xplore database, 1063-6390/97, published 1997.*
(Continued)

*Primary Examiner* — David L Lewis
*Assistant Examiner* — Matthew D. Hoel
(74) *Attorney, Agent, or Firm* — Neal, Gerber & Eisenberg LLP

(57) ABSTRACT

A gaming system including a plurality of generated primary symbols and at least one generated secondary symbol. If any generated primary symbol is associated with any generated secondary symbol, the gaming system provides an award based on the generated primary symbol being associated with the generated secondary symbol.

12 Claims, 10 Drawing Sheets

(56) References Cited

U.S. PATENT DOCUMENTS 5,332,228 A 7/1994 Schultz
5,342,049 A 8/1994 Wichinsky et al.
5,356,140 A 10/1994 Dabrowski et al.
5,364,100 A 11/1994 Ludlow et al.
5,373,440 A 12/1994 Cohen et al.
5,393,057 A * 2/1995 Marnell, II ..................... 463/13
5,393,061 A 2/1995 Manship et al.
5,395,111 A 3/1995 Inoue
5,423,539 A 6/1995 Nagao
5,431,408 A 7/1995 Adams
5,449,173 A 9/1995 Thomas et al.
5,524,888 A 6/1996 Heidel
5,531,440 A 7/1996 Dabrowski et al.
5,531,441 A 7/1996 Dabrowski et al.
5,536,016 A 7/1996 Thompson
5,542,669 A 8/1996 Charron et al.
5,584,485 A 12/1996 Jone et al.
5,584,764 A 12/1996 Inoue
5,609,524 A 3/1997 Inoue
5,611,535 A 3/1997 Tiberio
5,647,798 A * 7/1997 Falciglia ......................... 463/19
5,722,891 A 3/1998 Inoue
5,752,881 A 5/1998 Inoue
5,772,506 A 6/1998 Marks et al.
5,775,692 A 7/1998 Watts et al.
5,788,573 A * 8/1998 Baerlocher et al. ............ 463/16
5,810,361 A 9/1998 Kadlic
5,823,873 A 10/1998 Moody
5,823,874 A 10/1998 Adams
5,848,932 A 12/1998 Adams
5,851,148 A 12/1998 Brune et al.
5,863,249 A 1/1999 Inoue
5,882,261 A 3/1999 Adams
5,919,088 A 7/1999 Weiss
5,935,002 A 8/1999 Falciglia
5,947,821 A 9/1999 Stone
5,980,384 A * 11/1999 Barrie ............................. 463/16
5,989,121 A 11/1999 Sakamoto
6,004,207 A 12/1999 Wilson, Jr. et al.
6,015,346 A 1/2000 Bennett
6,033,307 A 3/2000 Vancura
6,059,289 A 5/2000 Vancura
6,059,658 A 5/2000 Mangano et al.
6,062,979 A 5/2000 Inoue
6,062,980 A 5/2000 Luciano
6,086,066 A 7/2000 Takeuchi et al.
6,089,976 A 7/2000 Schneider et al.
6,089,977 A 7/2000 Bennett
6,102,798 A 8/2000 Bennett
6,105,962 A 8/2000 Malavazos et al.
6,117,009 A 9/2000 Yoseloff
6,120,031 A 9/2000 Adams
6,120,378 A 9/2000 Moody et al.
6,126,542 A 10/2000 Fier
6,129,355 A 10/2000 Hahn et al.
6,149,521 A 11/2000 Sanduski
6,159,095 A 12/2000 Frohm et al.
6,159,098 A 12/2000 Slomiany et al.
6,186,894 B1 2/2001 Mayeroff
6,190,254 B1 2/2001 Bennett
6,190,255 B1 2/2001 Thomas et al.
6,203,428 B1 3/2001 Giobbi et al.
6,210,279 B1 4/2001 Dickinson
6,213,876 B1 4/2001 Moore, Jr.
6,220,959 B1 4/2001 Holmes, Jr. et al.
6,224,483 B1 5/2001 Mayeroff
6,227,971 B1 5/2001 Weiss
6,251,013 B1 6/2001 Bennett
6,270,412 B1 8/2001 Crawford et al.
6,290,600 B1 9/2001 Glasson
6,299,165 B1 10/2001 Nagano
6,299,170 B1 10/2001 Yoseloff
6,302,398 B1 10/2001 Vecchio
6,302,790 B1 10/2001 Brossard
6,311,976 B1 11/2001 Yoseloff et al.
6,315,663 B1 11/2001 Sakamoto
6,319,124 B1 11/2001 Baerlocher
6,322,078 B1 11/2001 Adams
6,328,649 B1 12/2001 Randall et al.
6,336,860 B1 1/2002 Webb
6,347,996 B1 2/2002 Gilmore et al.
6,358,144 B1 3/2002 Kaddlic et al.
6,394,902 B1 5/2002 Glavich et al.
6,398,218 B1 6/2002 Vancura
6,398,220 B1 6/2002 Inoue
6,416,406 B1 7/2002 Duhamel
6,419,579 B1 7/2002 Bennett
6,428,412 B1 8/2002 Anderson et al.
6,435,511 B1 8/2002 Vancura et al.
6,439,993 B1 8/2002 O'Halloran
6,439,995 B1 8/2002 Hughs-Baird et al.
6,443,452 B1 9/2002 Brune
6,454,266 B1 9/2002 Breeding et al.
6,461,241 B1 10/2002 Webb et al.
6,471,208 B2 10/2002 Yoseloff et al.
6,494,454 B2 12/2002 Adams
6,533,273 B2 3/2003 Cole et al.
6,533,661 B2 3/2003 Sanders
6,561,900 B1 * 5/2003 Baerlocher et al. ............ 463/20
6,561,904 B2 5/2003 Locke et al.
6,565,433 B1 * 5/2003 Baerlocher et al. ............ 463/20
6,569,015 B1 5/2003 Baerlocher et al.
6,575,830 B2 6/2003 Baerlocher et al.
6,589,114 B2 7/2003 Rose
6,595,854 B2 7/2003 Hughs-Baird et al.
6,604,740 B1 8/2003 Singer et al.
6,612,927 B1 9/2003 Slomiany et al.
6,616,142 B2 9/2003 Adams
6,616,531 B1 9/2003 Mullins
6,659,864 B2 12/2003 McGahn et al.
6,682,419 B2 * 1/2004 Webb et al. .................... 463/16
6,682,420 B2 * 1/2004 Webb et al. .................... 463/16
6,726,204 B2 4/2004 Inoue
6,733,389 B2 * 5/2004 Webb et al. .................... 463/20
6,761,632 B2 7/2004 Bansemer et al.
6,780,104 B2 8/2004 Fox
6,780,109 B2 8/2004 Kaminkow
6,793,578 B2 9/2004 Luccesi et al.
6,857,958 B2 * 2/2005 Osawa ............................ 463/20
6,866,583 B2 3/2005 Glavich et al.
6,905,406 B2 6/2005 Kaminkow et al.
6,913,532 B2 7/2005 Baerlocher et al.
6,918,832 B2 * 7/2005 Baerlocher et al. ............ 463/20
6,955,600 B2 10/2005 Glavich et al.
6,981,917 B2 * 1/2006 Webb et al. .................... 463/16
7,000,921 B2 2/2006 Schultz
7,014,560 B2 3/2006 Glavich et al.
7,052,395 B2 5/2006 Glavich et al.
7,066,814 B2 6/2006 Glavich et al.
7,094,148 B2 8/2006 Baerlocher et al.
7,121,942 B2 10/2006 Baerlocher
7,137,888 B2 11/2006 Glavich et al.
7,169,042 B2 1/2007 Muir et al.
7,235,011 B2 6/2007 Randall et al.
7,238,110 B2 7/2007 Glavich et al.
7,255,643 B2 8/2007 Ozaki et al.
7,258,611 B2 8/2007 Bigelow, Jr. et al.
7,273,415 B2 9/2007 Cregan et al.
7,306,518 B2 12/2007 Hughs-Baird et al.
7,316,611 B2 * 1/2008 Byrne ....................... A63F 3/06
273/138.1
7,316,613 B2 1/2008 Luccesi et al.
7,322,887 B2 1/2008 Belger et al.
7,331,867 B2 2/2008 Baerlocher et al.
7,371,171 B1 5/2008 Engleman et al.
7,381,134 B2 6/2008 Cuddy et al.
7,384,334 B2 6/2008 Glavich et al.
7,402,103 B2 7/2008 Baerlocher
7,473,173 B2 * 1/2009 Peterson et al. ................ 463/20
7,585,221 B2 * 9/2009 Singer et al. ................... 463/20
7,780,519 B2 * 8/2010 Gomez ............... G07F 17/3244
463/13
7,837,547 B2 * 11/2010 Cannon ................... G07F 17/32
463/16

(56) References Cited

U.S. PATENT DOCUMENTS

| | | | | |
|---|---|---|---|---|
| 2001/0019965 | A1 | 9/2001 | Ochi | |
| 2002/0142829 | A1 | 10/2002 | Inoue | |
| 2002/0155882 | A1 | 10/2002 | Baerlocher et al. | |
| 2002/0160828 | A1* | 10/2002 | Webb et al. | 463/16 |
| 2002/0160829 | A1* | 10/2002 | Webb et al. | 463/16 |
| 2002/0198042 | A1* | 12/2002 | Webb et al. | 463/20 |
| 2003/0040355 | A1 | 2/2003 | Baerlocher | |
| 2003/0060267 | A1 | 3/2003 | Glavich et al. | |
| 2003/0064773 | A1 | 4/2003 | Baerlocher et al. | |
| 2003/0064781 | A1 | 4/2003 | Muir | |
| 2003/0190947 | A1* | 10/2003 | Baerlocher et al. | 463/20 |
| 2003/0190948 | A1* | 10/2003 | Baerlocher et al. | 463/20 |
| 2003/0203752 | A1 | 10/2003 | Kaminkow et al. | |
| 2003/0203753 | A1 | 10/2003 | Muir et al. | |
| 2003/0216165 | A1 | 11/2003 | Singer et al. | |
| 2003/0232643 | A1 | 12/2003 | Inoue | |
| 2004/0012145 | A1 | 1/2004 | Inoue | |
| 2004/0014516 | A1 | 1/2004 | Inoue | |
| 2004/0014517 | A1 | 1/2004 | Inoue | |
| 2004/0018866 | A1 | 1/2004 | Inoue | |
| 2004/0026854 | A1 | 2/2004 | Inoue | |
| 2004/0029636 | A1 | 2/2004 | Wells | |
| 2004/0036218 | A1 | 2/2004 | Inoue | |
| 2004/0038726 | A1 | 2/2004 | Inoue | |
| 2004/0041340 | A1 | 3/2004 | Inoue | |
| 2004/0171415 | A1* | 9/2004 | Webb et al. | 463/16 |
| 2004/0209663 | A1* | 10/2004 | Webb et al. | 463/16 |
| 2004/0219969 | A1 | 11/2004 | Casey et al. | |
| 2005/0054421 | A1 | 3/2005 | Hughs-Baird et al. | |
| 2005/0070353 | A1* | 3/2005 | Webb et al. | 463/16 |
| 2005/0075163 | A1 | 4/2005 | Cuddy et al. | |
| 2006/0063578 | A1 | 3/2006 | Bansemer et al. | |
| 2006/0068875 | A1 | 3/2006 | Cregan et al. | |
| 2006/0073879 | A1 | 4/2006 | Baerlocher | |
| 2006/0094496 | A1* | 5/2006 | Webb et al. | 463/20 |
| 2006/0211472 | A1 | 9/2006 | Walker et al. | |
| 2006/0211473 | A1 | 9/2006 | Walker et al. | |
| 2006/0211474 | A1 | 9/2006 | Walker et al. | |
| 2006/0211482 | A1 | 9/2006 | Pimienta et al. | |
| 2007/0054726 | A1* | 3/2007 | Muir et al. | 463/16 |
| 2010/0105467 | A1* | 4/2010 | Stone | A63F 1/00 463/22 |

FOREIGN PATENT DOCUMENTS

| | | |
|---|---|---|
| AU | A-50327/96 | 10/1997 |
| AU | B-722 969 | 6/1998 |
| AU | A-63553/98 | 10/1998 |
| AU | 199917318 A1 | 9/1999 |
| EP | 0 798 676 B1 | 10/1997 |
| EP | 0 926 645 A2 | 6/1999 |
| EP | 0 944 030 A2 | 9/1999 |
| EP | 0 945 837 A2 | 9/1999 |
| EP | 0 984 408 A2 | 3/2000 |
| EP | 1 296 296 | 3/2003 |
| EP | 1 296 609 | 4/2003 |
| GB | 2 083 936 A | 3/1982 |
| GB | 2 096 376 A | 10/1982 |
| GB | 2 097 160 A | 10/1982 |
| GB | 2 117 155 A | 10/1983 |
| GB | 2 170 636 A | 8/1986 |
| GB | 2 183 882 A | 6/1987 |
| GB | 2 201 821 A | 9/1988 |
| GB | 2 226 436 A | 6/1990 |
| GB | 2 328 311 A | 2/1999 |
| GB | 2 353 128 A | 2/2001 |
| WO | WO 97/32285 | 9/1997 |
| WO | WO 99/44095 | 9/1999 |
| WO | WO 00/66235 | 11/2000 |
| WO | WO 00/76606 | 12/2000 |
| WO | WO 01/09664 | 2/2001 |
| WO | WO 01/15128 | 3/2001 |
| WO | WO 01/15132 | 3/2001 |
| WO | WO 01/55127 | 8/2001 |
| WO | WO 2004/102520 | 11/2004 |
| WO | WO 2006/038819 | 4/2006 |

OTHER PUBLICATIONS

3-Way Action Poker Brochure and Article written by written by IGT, published in 2002, on or before December thereof.

Barn Yard Advertisement written by Aristocrat, available prior to Jun. 9, 2003.

Barn Yard Article written by Strictly Slots, published in Mar. 2002.

Black Swan Paytable Display written by IGT, published prior to 2001.

Bonus Times Article written by Strictly Slots, published in Jul. 2000.

Boot Scootin Article written by Strictly Slots/Aristocrat Leisure Industries, PTY Ltd., published prior to Jul. 25, 2006.

Break the Spell Article written by Strictly Slots/Atronic Casino Technology, Ltd., published in Sep. 2000.

Break the Spell Atonic Web Page, published in Jan. 2001.

Break the Spell Brochure, published in 1999.

Cash Chameleon Article written by Strictly Slots/Aristocrat Leisure Industries, PTY Ltd., published in Apr. 2001.

Cossack Dance Advertisement written by Olympic Video Gaming, published prior to 2002.

Description of Symbol Feature in Australian UFO Gaming Machine written by Barcrest Ltd., published in 1995.

Double Diamond Line Advertisement written by Bally Gaming Systems, published in 2000.

Enchanted Forest™ Gaming Description from Aristocrat, available in 1994.

Enchanted Unicorn Advertisement written by IGT, published in 2001.

Fire and Fortune Article in Strictly Slots, Anchor Games, published in May 2001.

Fishin' Buddies Article published in Strictly Slots/Anchor Games, published in Apr. 2001.

Happy Camper Advertisement written by Igt, published in 2001.

In Between Game Description written by Igt, available prior to 2000, on or before Dec. thereof.

Introducing the "Smiling Ape" Machine Advertisement (including Joker's Wild Poker description) written by Igt, published prior to 2001.

Jackpot Party Brochure and Articles written by WMS Gaming, Inc, published in 1988.

Joker's Wild Advertisement written by IGT, published prior to 2001.

Little Green Men, Jr. Advertisement written by A.C. Coin and Slot Services Company, published prior to 2002.

Loco Loot Article written by Strictly Slots/Aristocrat Leisure Industries, PTY Ltd., published in May 2002.

Mountain Money Article written by Strictly Slots/Aristocrat Leisure Industries, PTY Ltd., published in Jun. 2002.

Neon Nights Article written by IGT, published in 2000, on or before Dec. thereof.

Penguin Pays Advertisement written by Aristocrat Incorporated, published in 1998.

Polly & Roger Brochure written by VLC, Inc., published in 2000, on or before December thereof.

Red, White and Blue Advertisement written by Strictly Slots, published in 2000.

Reel Magic™ Gaming Machine Description written by IGT, available in 1986.

Slot Machines, A Pictorial History of the First 100 Years, pp. 68, 70, 71, 77, 78, 87, 96, 102 and 163, Fifth Edition by Marshell Fey, published in 1997.

Take Your Pick Advertisement written by IGT/Anchor Gaming, published in 1999, on or before December thereof.

Take Your Pick Article, Strictly Slots, published Mar. 2001.

The Basics of Winning Video Poker (Chapter VI Deuces Wild & Chapter VII Jokers Wild) written by J. Edward Allen, published in 1990.

(56) References Cited

OTHER PUBLICATIONS

Vision Series/Good Times Brochure written by IGT, published in 1999, on or before December thereof.
Wheel Poker Article written by Strictly Slots (Anchor Games), published in Nov. 2000.
Wild Streak Advertisement written by WMS Gaming, Inc., published in Mar. 2001.
X Factor Brochure written by WMS Gaming, Inc., published in 1998, on or before December thereof.
Your Real Key to Gaming Success Advertisement (including Roll Over Beethoven and Wild Fortune) written by Olympic Video Gaming, published prior to 2005.

* cited by examiner

GAMING SYSTEM, GAMING DEVICE AND METHOD HAVING SECONDARY SYMBOLS ASSOCIATED WITH PRIMARY SYMBOLS

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Gaming machines which provide secondary symbols are also known. The secondary symbols generally form independent combinations with each other which provide additional awards to the player. For example, a gaming machine that generates primary symbols and secondary symbols will generally provide a first award based on a primary symbol combination, and a second award based on a separate secondary symbol combination. To increase player enjoyment and excitement, it is desirable to provide players with new types of gaming devices that attract the player and keep the player entertained. Accordingly, a need exists for the further development of secondary games.

SUMMARY

In one embodiment, the gaming system, gaming device and method disclosed herein provides one or more awards if a designated secondary symbol or sub-symbol is generated in association with a generated designated primary symbol. In one embodiment, the gaming device includes a game having a plurality of primary symbols or base symbols on a plurality of primary symbol generators, such as reels. In this embodiment, the game also includes one or more separate secondary symbols or sub-symbols on one or more secondary symbol generators, such as reels. In operation, the gaming device generates a plurality of the primary symbols and zero, one or more of the secondary symbols. The gaming device determines if any of the generated primary symbols are associated with any of the generated secondary symbols. In one such embodiment, an association occurs if the generated primary symbol and the generated secondary symbol are each generated in or at a designated symbol position. If any of the generated primary symbols are associated with any of the generated secondary symbols, the gaming device provides one or more awards to the player or triggers one or more bonus events. Accordingly, the gaming device and method disclosed herein enables the player to potentially receive an award or otherwise cause a bonus event to occur based on one or more interactions or couplings between a generated primary symbol and a generated secondary symbol.

In one embodiment, one or more of the plurality of primary symbols each have a characteristic, property or attribute. In this embodiment, one or more of the plurality of secondary symbols also each have a characteristic, property or attribute. In operation of this embodiment, if the characteristic associated with any generated primary symbol matches, relates to or is otherwise associated with the characteristic associated with any generated secondary symbol, the gaming device provides one or more awards to the player or triggers one or more bonus events. It should be appreciated that in this embodiment, if a generated primary symbol and generated secondary symbol are each otherwise associated with one another, but the primary symbol characteristic does not match the secondary symbol characteristic, the gaming device does not provide an award to the player (or trigger a bonus event). Accordingly, this embodiment provides a player an award if any generated primary symbol characteristic is associated with any generated secondary symbol characteristic.

In one embodiment, the gaming device includes a first determination of whether to enable the generation of one or more secondary symbols. In this embodiment, if the result of the first determination is to enable the generation of one or more secondary symbols, the gaming device next determines whether to generate zero, one or more secondary symbols. In one such embodiment, the gaming device generates zero, one or more secondary symbols if the player places one or more side wagers (i.e., the side wager enables the generation of zero, one or more secondary symbols). In one embodiment, the gaming device generates zero, one or more secondary symbols upon an occurrence of a triggering event (i.e., the occurrence of the triggering event enables the generation of zero, one or more secondary symbols).

In another embodiment, the gaming device is enabled to generate one or more secondary symbols and includes a first determination of whether to generate zero, one or more secondary symbols. In one such embodiment, the gaming device generates zero, one or more secondary symbols upon the player placing the wager on the primary game. In this embodiment, the placement of the wager on the primary game enables the generation of zero, one or more secondary symbols.

In one embodiment, after determining whether to generate zero, one or more secondary symbols, the gaming device generates a plurality of primary symbols on a plurality of primary symbol reels. In this embodiment, if the gaming device determines to generate one or more secondary symbols, the gaming device generates one or more secondary symbols on one or more secondary reels.

After the gaming device generates primary symbols and zero, one or more secondary symbols, the gaming device determines if any generated primary symbols are associated with any of the generated secondary symbols. In one embodiment, a generated primary symbol is associated with a generated secondary symbol if the primary symbol is part of a winning primary symbol combination and the secondary symbol is associated in the same symbol position as the primary symbol. For example, if the gaming device generates both the primary symbol and the secondary symbol in or at the same symbol position and the primary symbol is part of a winning primary symbol combination, then the primary symbol is associated with the generated secondary symbol. It should be appreciated that this embodiment increases the volatility of the gaming device because to win an additional award, not only do the appropriate secondary symbols need to be generated in association with the appropriate primary symbols, but the generated primary symbols must also be part of a winning primary symbol combination.

In another embodiment, a generated primary symbol is associated with a generated secondary symbol if both the primary symbol and the secondary symbol are generated in or at a designated symbol position. For example, if the gaming device generates both the primary symbol and the secondary symbol in or at the same symbol position, then the primary symbol is associated with the generated secondary symbol. In another embodiment, a generated primary symbol is associated with a generated secondary symbol if a characteristic of a generated secondary symbol matches a characteristic of a generated primary symbol. For example, if a characteristic of a generated primary symbol matches the characteristic of a generated secondary symbol, the primary symbol is associated with the secondary symbol. In another embodiment, a designated generated primary symbol is associated with a designated generated secondary symbol if the gaming device generates: (i) one or more activated secondary symbols; and (ii) one or more predetermined primary symbols. For example, in one embodiment, the predetermined one or more primary symbols is a winning combination of three primary symbols on a single payline.

In one embodiment, if any of the generated primary symbols are associated with any of the generated secondary symbols, the gaming device provides one or more awards to the player, or triggers a bonus event. In one embodiment, if any of the primary symbol characteristics are associated with any of the one or more separate secondary symbol characteristics, the gaming device provides one or more awards to the player, or triggers a bonus event.

Additional features and advantages are described herein, and will be apparent from the following Detailed Description and the figures.

DETAILED DESCRIPTION

The present disclosure may be implemented in various configurations for gaming machines, gaming devices, or gaming systems, including but not limited to: (1) a dedicated gaming machine, gaming device, or gaming systems wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
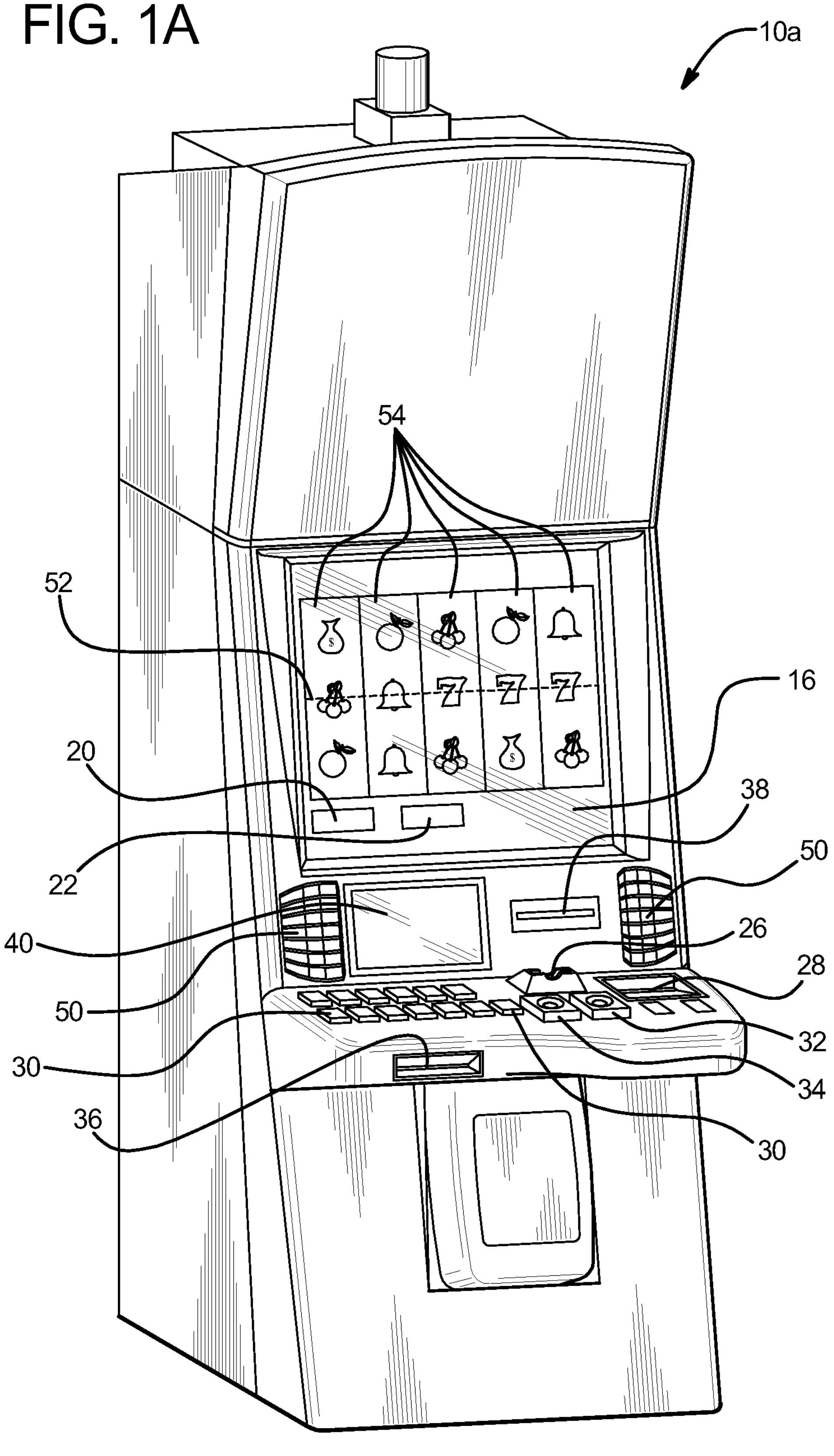
FIGS. 1A and 1B are front perspective views of alternative embodiments of gaming devices disclosed herein.
Figure 1B:
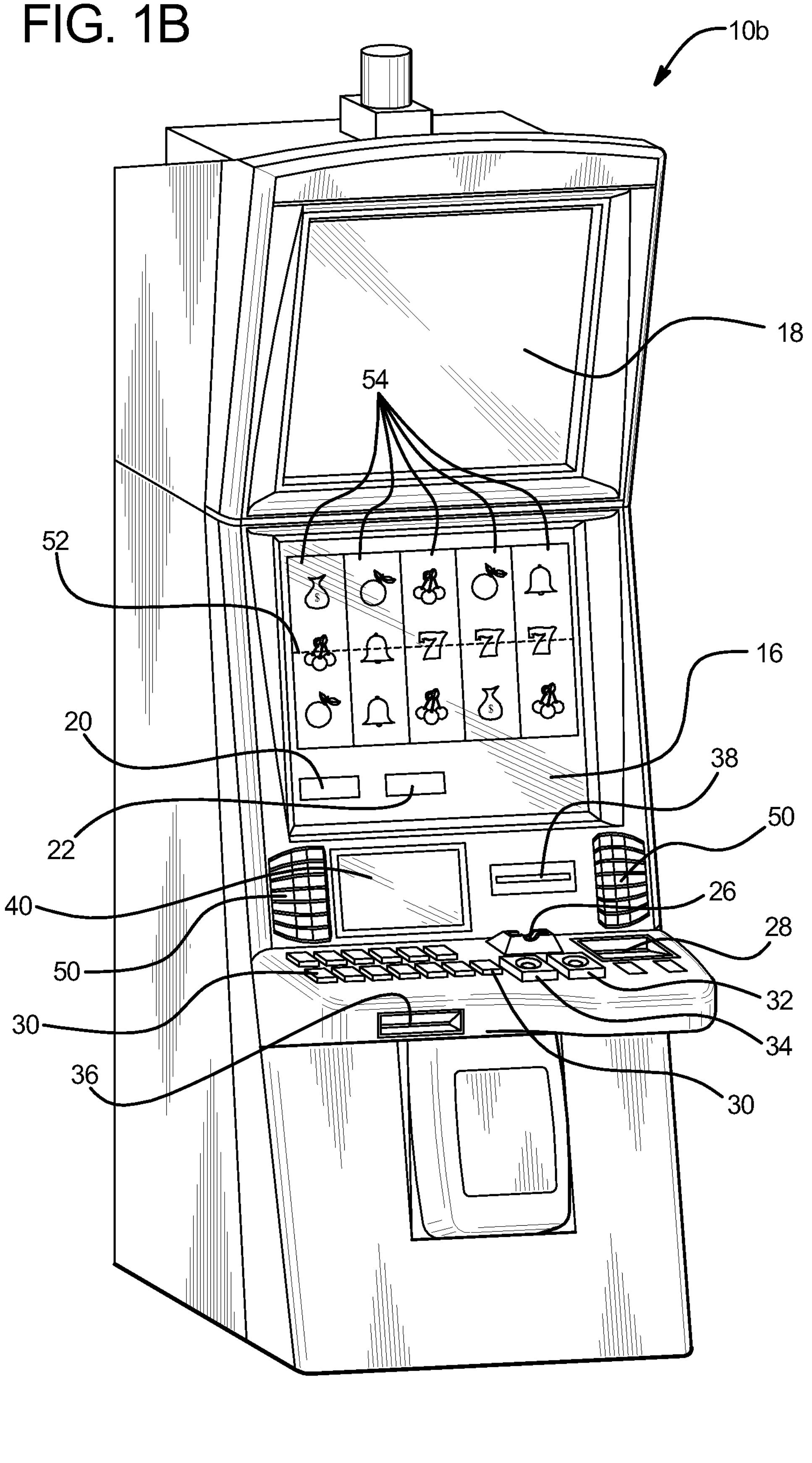

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
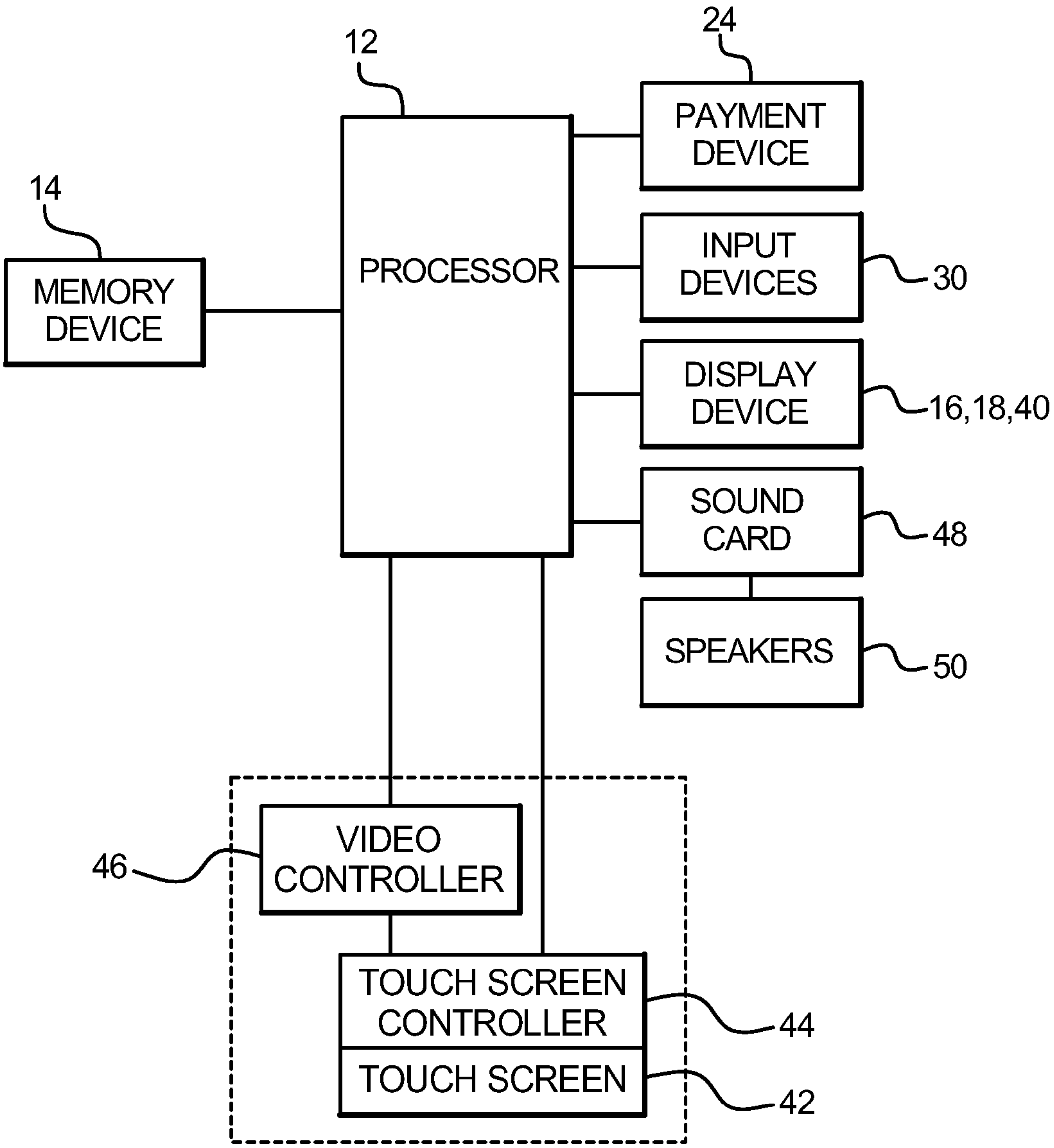
FIG. 2A is a schematic block diagram of the electronic configuration of one embodiment of a gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data), and other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
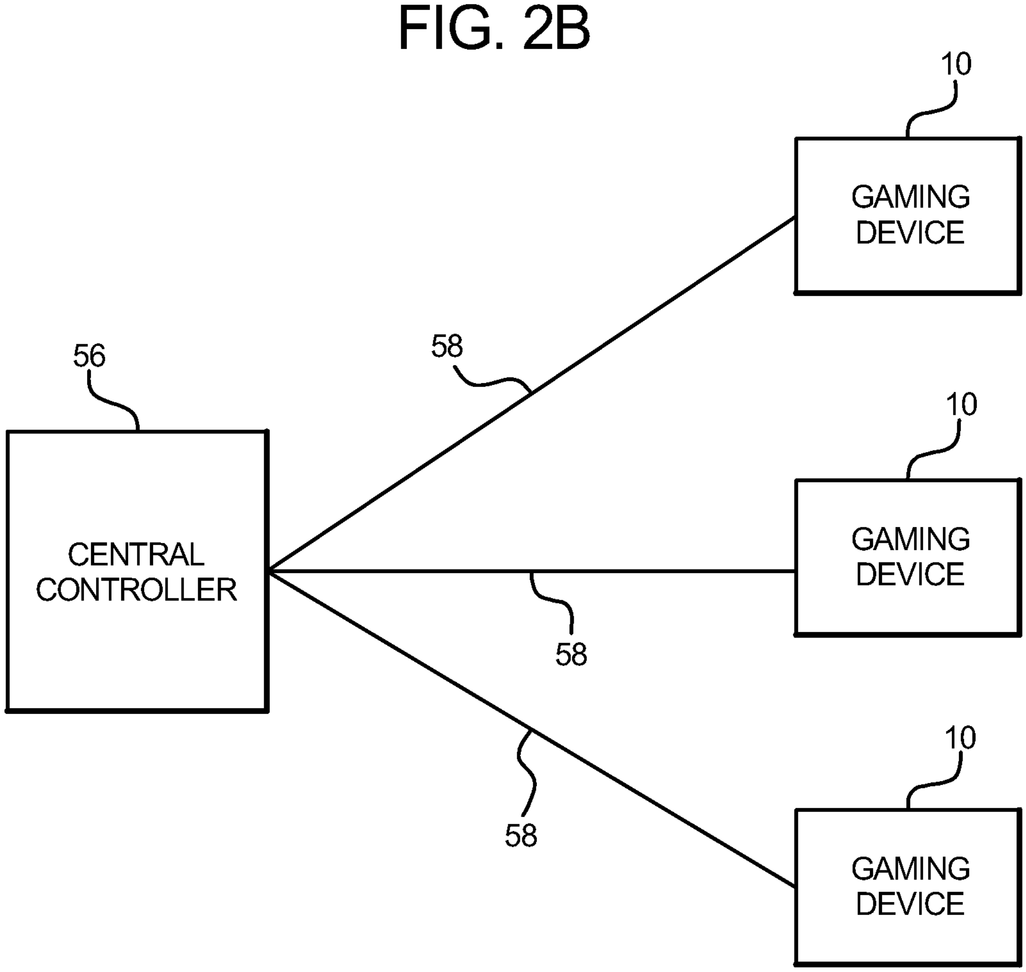
FIG. 2B is a schematic diagram of the central server in communication with a plurality of gaming machines in accordance with one embodiment of the gaming system disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Primary and Secondary Symbols

Figure 3:
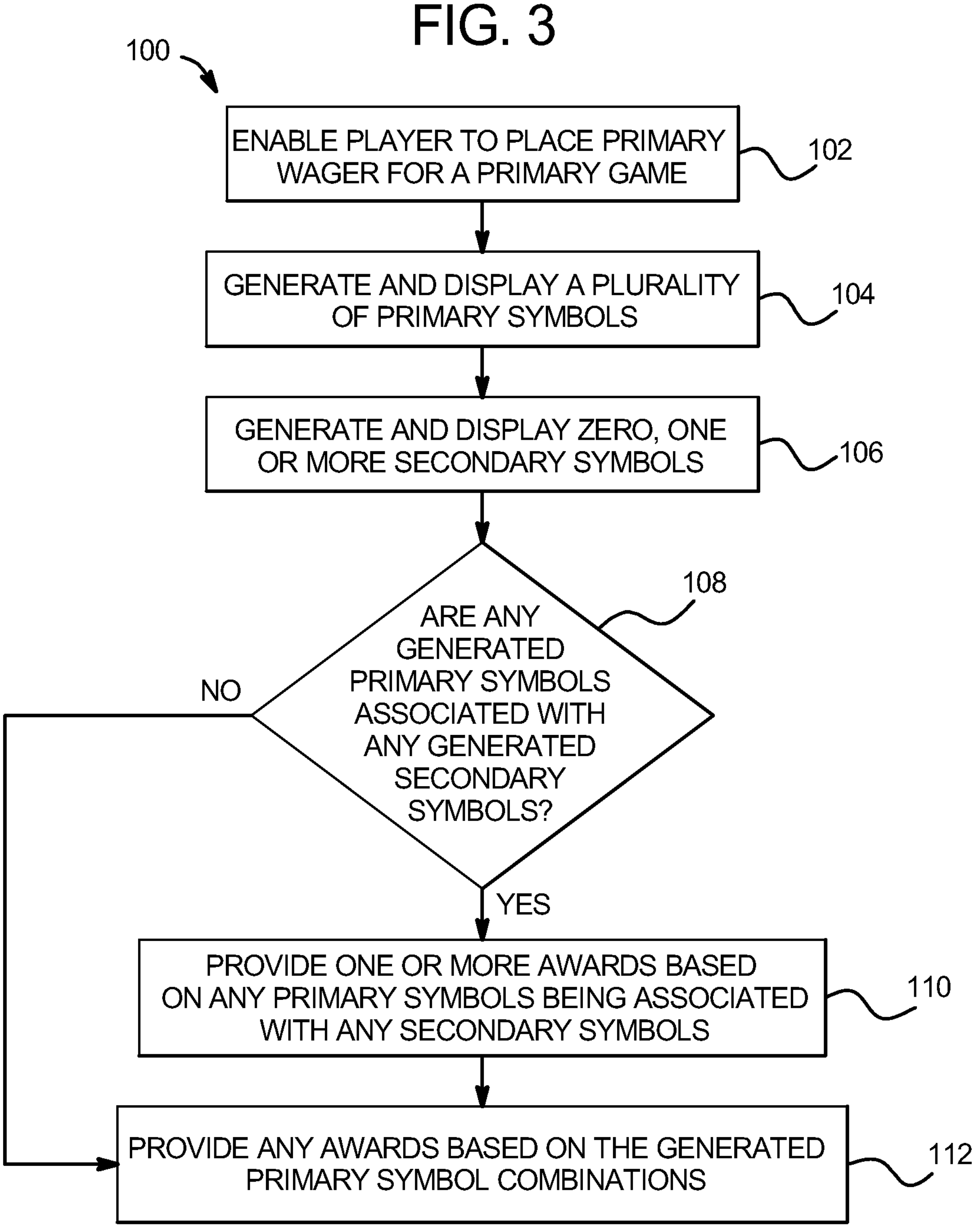
FIG. 3 is a flowchart of one embodiment of the gaming system disclosed herein illustrating providing one or more awards based on any primary symbols being associated with any secondary symbols.

FIG. 3 illustrates one embodiment of the method of the present disclosure which determines whether to generate any secondary symbols, and provides one or more awards based on any generated primary symbols being associated with any generated secondary symbols.

The gaming system or gaming device enables a player to place a primary wager for a primary game as indicated by block 102. When a player deposits funds into the gaming device, the gaming device determines the amount of funds inserted and displays that amount on a credit meter or other suitable display.

After the player places the primary wager, the gaming device generates a plurality of primary symbols as indicated by block 104. As indicated in block 106, the gaming device generates and displays zero, one or more secondary symbols. In this embodiment, if the gaming device determines not to generate any secondary symbols, the gaming device provides any awards based on the generated primary symbol combinations as indicated by block 112.

In one embodiment, the gaming device determines whether to generate at least one secondary symbol before the primary symbols are generated and displayed. In another embodiment, the gaming device determines whether to generate at least one secondary symbol after the primary symbols are generated and displayed. In different embodiments, the gaming device determines whether the primary symbols form any winning primary symbol combinations before, during or after any secondary symbols are displayed to the player.

After generating zero, one or more secondary symbols, the gaming device determines if any generated primary symbols are associated with any generated secondary symbols as indicated by block 108.

If the gaming device determines that a generated primary symbol is associated with a generated secondary symbol, the gaming device provides one or more awards based on any primary symbols being associated with any secondary symbols as indicated by block 110. In this embodiment, the gaming device also provides any awards based on the generated primary symbol combinations as indicated by block 112. On the other hand, if the gaming device determines that no generated primary symbols are associated with any generated secondary symbols, the gaming device provides any awards based on the generated primary symbol combinations as indicated by block 112.

Figure 4A:
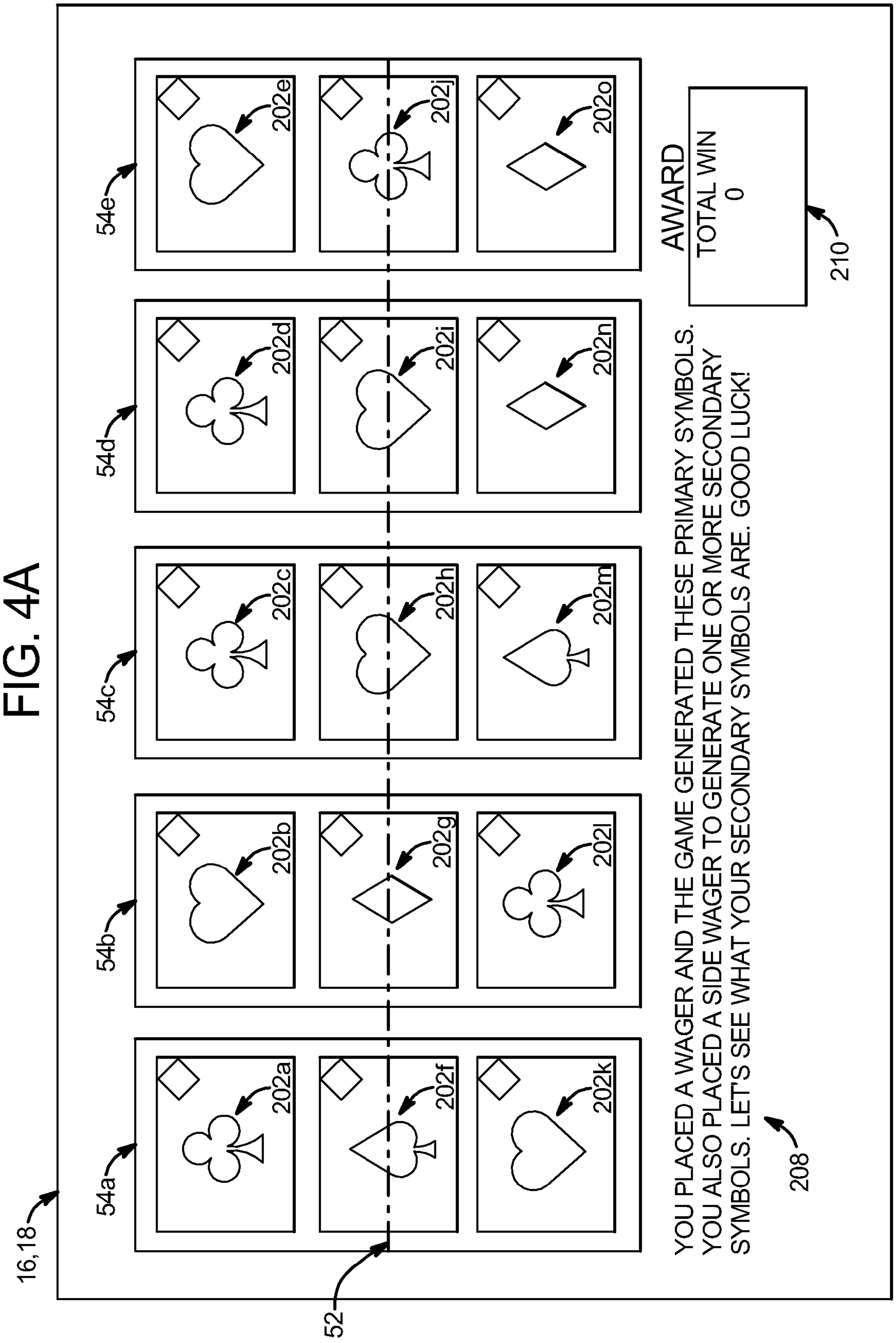
FIGS. 4A and 4B are front views of one embodiment of the gaming system illustrating an example of generating primary symbols and secondary symbols and the primary symbols being associated with the secondary symbols.
Figure 4B:
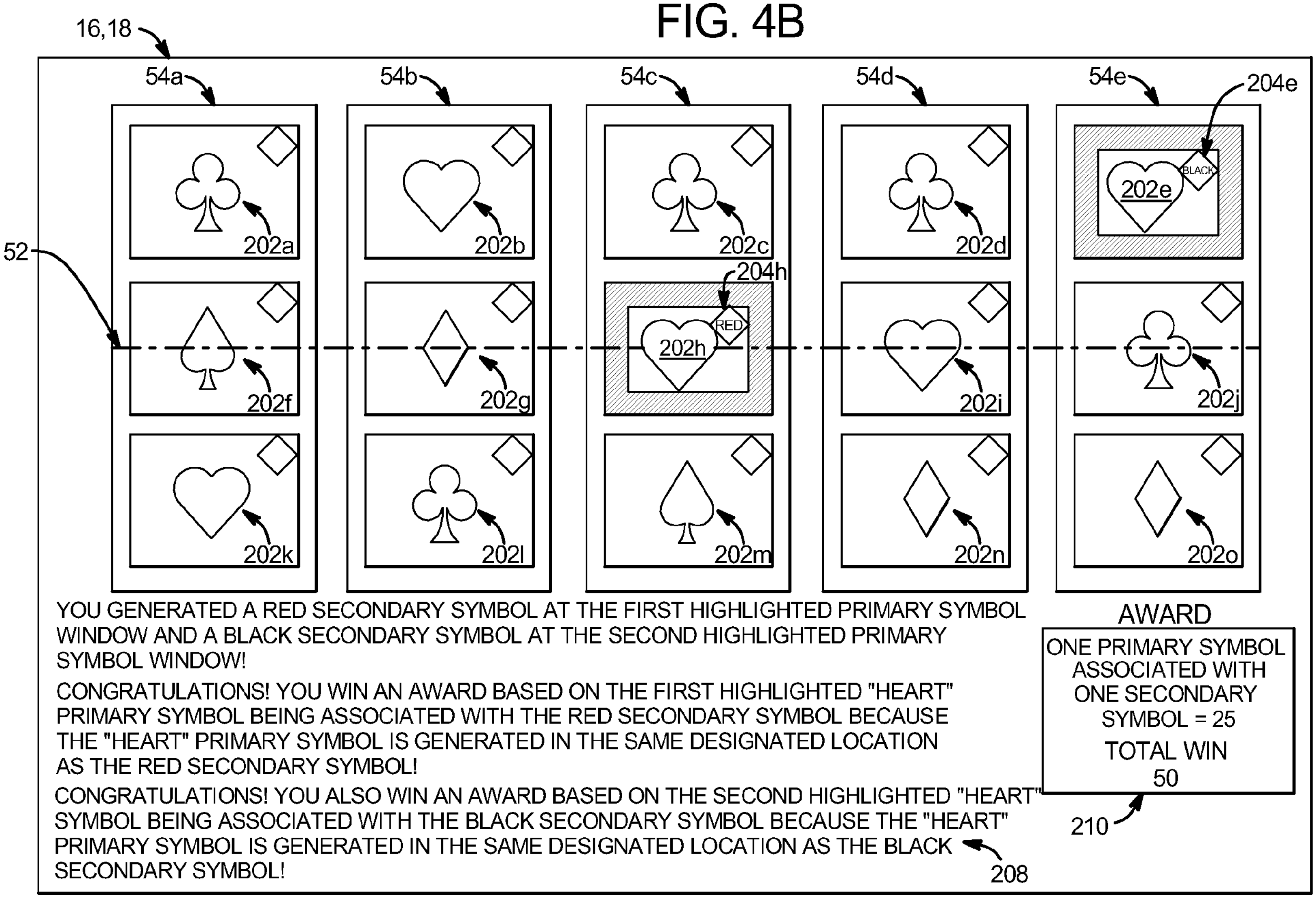

Referring to FIGS. 4A and 4B, this embodiment generally shows an example illustrating the gaming device generating primary symbols and secondary symbols and an example of primary symbols being associated with secondary symbols. In this embodiment, the gaming device provides the player an award of twenty-five credits for each generated primary symbol associated with a generated secondary symbol.

As illustrated in FIG. 4A, the display device 16 or 18 displays a primary game, and more particularly a slot game, which includes a plurality of reels 54*a*, 54*b*, 54*c*, 54*d* and 54*e*. In this example, the reels include a plurality of generated primary symbols 202*a* to 202*o*.

The display device 16 or 18 also includes an award indicator 210. The award indicator 210 displays how many credits or other types of awards are provided for the playing the game. The award indicator 210 shows the number zero, indicating that the player has not yet won an award for playing the game.

In FIG. 4A, the gaming device generated and displayed a plurality of primary symbols 202*a* through 202*o* on the primary symbol reels 54*a* through 54*e*. In this example, each of the primary symbols include an opening or a window. The openings are configured to receive a secondary symbol.

In one embodiment, the gaming device includes a first determination of whether to enable the generation of one or more secondary symbols. In this embodiment, if the result of the first determination is to enable the generation of one or more secondary symbols, the gaming device next determines whether to generate zero, one or more secondary symbols. In one such embodiment, the gaming determines whether to generate one or more secondary symbols based on if the player places a side wager (i.e., the side wager enables the generation of zero, one or more secondary symbols). In this example, the gaming device generated the primary symbols before generating the secondary symbols. Appropriate messages such as "YOU PLACED A WAGER AND THE GAME GENERATED THESE PRIMARY SYMBOLS. YOU ALSO PLACED A SIDE WAGER TO GENERATE ONE OR MORE SECONDARY SYMBOLS. LET'S SEE WHAT YOUR SECONDARY SYMBOLS ARE. GOOD LUCK!" may be provided to the player visually, such as in the message display 208, or through suitable audio or audiovisual displays.

Referring to FIG. 4B, in this example, after the player placed a side wager, the gaming device generated secondary symbols 204*e* and 204*h*. In this example, the generated secondary symbols are different. That is, secondary symbol 204*e* is a black secondary symbol and secondary symbol 204*h* is a red secondary symbol.

In FIG. 4B, primary symbol 202*e* is associated with secondary symbol 204*e* because both the primary symbol 202*e* and the secondary symbol 204*e* are generated in the same designated location or symbol location. Primary symbol 202*h* is also associated with secondary symbol 204*h* because both the primary symbol 202*h* and the secondary symbol 204*h* are generated in the same designated location.

It should be appreciated that in this example, the player is not provided with an award based on the generated primary symbol combinations because the gaming device did not generate and display a predetermined primary winning symbol combination. That is, in this example, the combination of SPADE, DIAMOND, HEART, HEART and CLUB on payline 52 is not a winning primary symbol combination.

The gaming device provides a twenty-five credit award for the generated primary symbol 202*e* being associated with generated secondary symbol 204*e*. The gaming device also provides a twenty-five credit award for the generated primary symbol 202*h* being associated with generated secondary symbol 204*h*. Thus, the gaming device provides the player a total award of fifty credits as illustrated by the award indicator 210. Appropriate messages such as "YOU GENERATED A RED SECONDARY SYMBOL AT THE FIRST HIGHLIGHTED PRIMARY SYMBOL WINDOW AND A BLACK SECONDARY SYMBOL AT THE SECOND HIGHLIGHTED PRIMARY SYMBOL WINDOW!" and "CONGRATULATIONS! YOU WIN AN AWARD BASED ON THE FIRST HIGHLIGHTED "HEART" PRIMARY SYMBOL BEING ASSOCIATED WITH THE RED SECONDARY SYMBOL BECAUSE THE "HEART" PRIMARY SYMBOL IS GENERATED IN THE SAME DESIGNATED LOCATION AS THE RED SECONDARY SYMBOL!" and "CONGRATULATIONS! YOU ALSO WIN AN AWARD BASED ON THE SECOND HIGHLIGHTED "HEART" PRIMARY SYMBOL BEING ASSOCIATED WITH THE BLACK SECONDARY SYMBOL BECAUSE THE "HEART" PRIMARY SYMBOL IS GENERATED IN THE SAME DESIGNATED LOCATION AS THE BLACK SECONDARY SYMBOL!" may be provided to the player visually, such as in the message display 208, or through suitable audio or audiovisual displays.

In an alternative embodiment, the gaming device provides an award because both the primary symbol 202*e* and the secondary symbol 204*e* are generated in the same designated location, and they are generated at or on the pay line 52. In this alternative embodiment, it should be appreciated that the gaming device does not provide the player an award based on the generated primary symbol 202*e* and the generated secondary symbol 204*e* because the generation is not at or on the pay line 52.

Figure 5:
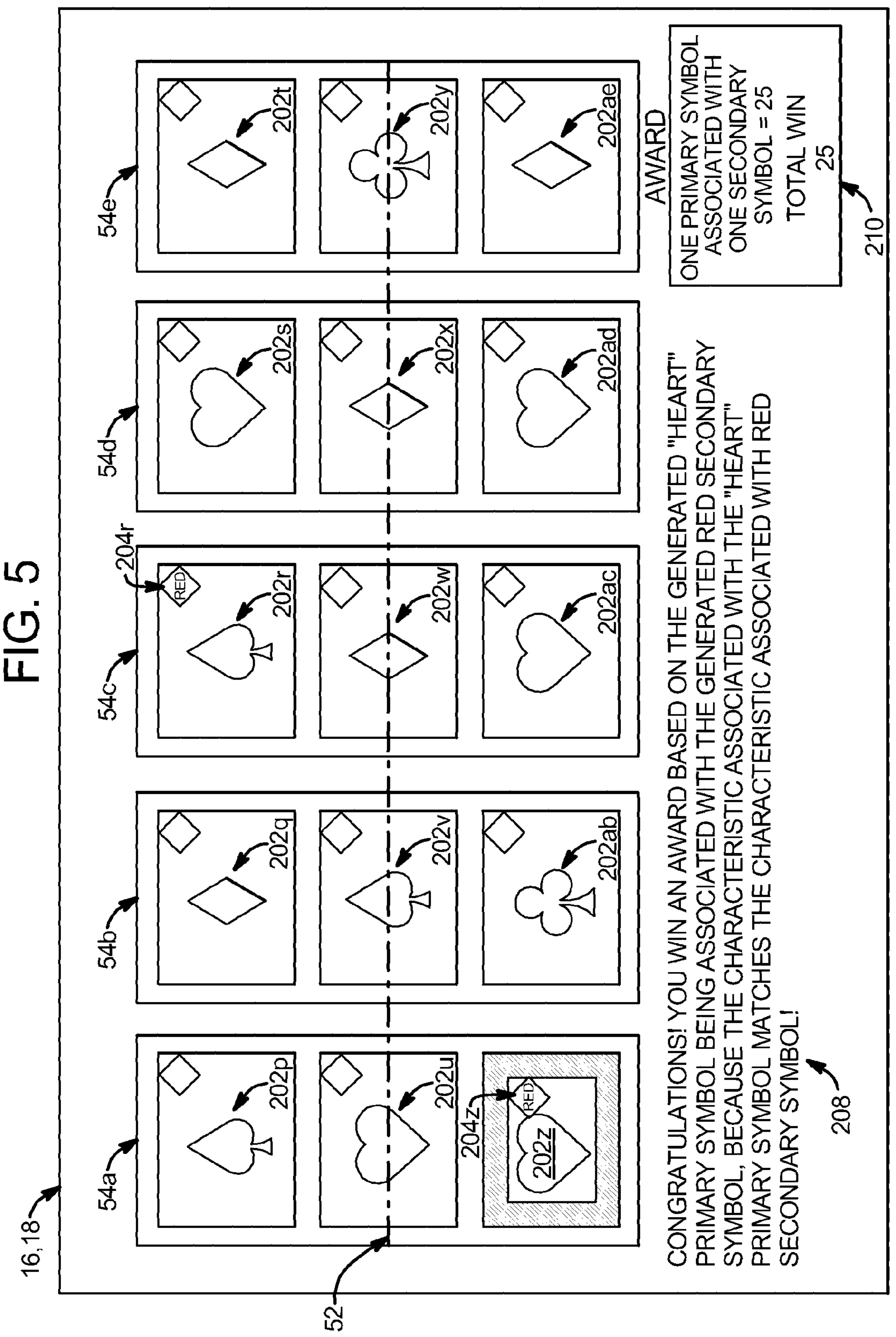
FIG. 5 is a front view of one alternative embodiment of the gaming system illustrating an example of the primary symbol characteristic being associated with the secondary symbol characteristic.

FIG. 5 generally shows an example illustrating a primary symbol characteristic being associated with a secondary symbol characteristic. In this example embodiment, the gaming device provides the player a twenty-five credit award for each primary symbol characteristic being associated with a secondary symbol characteristic.

In FIG. 5, both the generated primary symbol 202*z* and the generated secondary symbol 204*z* have matching color characteristics. That is, the red characteristic of secondary symbol 204*z* matches the red characteristic of primary symbol 202*z*. Thus, the characteristic of the generated primary symbol 202*z* is associated with the characteristic of the generated secondary symbol 204*z* and the gaming device provides an award to the player accordingly.

It should be appreciated that in this example, the characteristic of primary symbol 202*r* does not match the characteristic of secondary symbol 204*r*. That is, the black characteristic of primary symbol 202*r* does not match the red characteristic of 204*r*. Thus, primary symbol 202*r* is not associated with secondary symbol 204*r* and the gaming device does not provide an award to the player for any association between primary symbol 202*r* and secondary symbol 204*r*.

In this example embodiment, the gaming device provides the player with a twenty-five credit award for each generated association as illustrated by the award indicator 210. An appropriate message such as "CONGRATULATIONS! YOU WIN AN AWARD BASED ON THE GENERATED "HEART" PRIMARY SYMBOL BEING ASSOCIATED WITH THE GENERATED RED SECONDARY SYMBOL BECAUSE THE CHARACTERISTIC ASSOCIATED WITH THE "HEART" PRIMARY SYMBOL MATCHES THE CHARACTERISTIC ASSOCIATED WITH THE RED SECONDARY SYMBOL!" may be provided to the player visually, such as in the message display 208, or through suitable audio or audiovisual displays.

Figure 6:
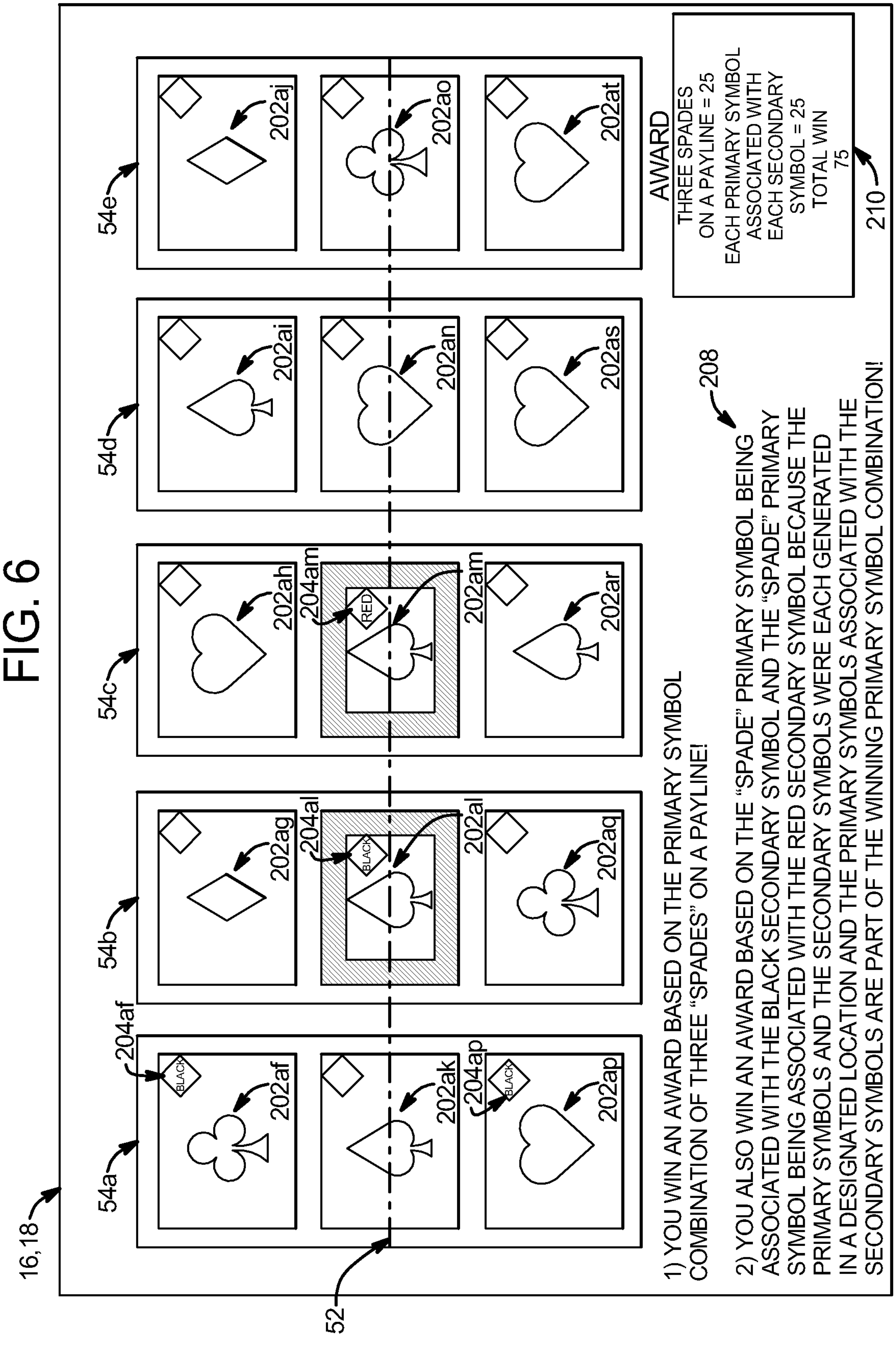
FIG. 6 is a front view of one alternative embodiment of the gaming system illustrating an example of both the primary game symbols and the secondary symbols being generated in the same designated location and the location being located on a winning symbol combination.

Referring to FIG. 6, this embodiment generally shows an example illustrating primary game symbols associated with secondary game symbols because both the primary game symbols and the secondary game symbols are generated in the same designated location and are part of a winning symbol combination. It should be appreciated that this embodiment increases the volatility of the gaming device because to win an additional award, not only do the appropriate secondary symbols need to be generated in association with the appropriate primary symbols, but the generated primary symbols must also be part of a winning primary symbol combination. In this example, the gaming device provides the player with a total award of seventy-five credits based on the generated primary symbol combination and based on the primary symbols being associated with the secondary symbols.

In FIG. 6, the primary game generated three spades primary symbols (i.e., 202*ak*, 202*al* and 202*am*) on payline 52. In this example, three spade primary symbols on a single pay line is a predetermined winning primary symbol combination that awards twenty-five credits as illustrated by the award indicator 210. The gaming device also generated one red secondary symbol 204*am* and three black secondary symbols 204*af*, 204*al* and 204*ap*. In this example, both the SPADE primary symbol 202*al* and the black secondary symbol 204*al* are generated in the same designated location. Additionally, in this embodiment, both the SPADE primary symbol 202*am* and the red secondary symbol 204*am* are generated in the same designated location. In the illustrated example, the gaming device provides an additional award because: (i) the generated primary symbols 202*al* and 202*am* are generated in the same designated location as generated secondary symbols 204*al* and 204*am*, respectively; and (ii) each of the primary symbols (i.e., 202*al* and 202*am*) generated in the same designated location as the secondary symbols (i.e., 204*al* and 204*am*) are included in a primary game winning combination (i.e., three SPADES on payline 52). It should be appreciated that although generated primary symbols CLUB 202*af* and HEART 202*ap* are generated in the same designated location as the secondary symbols 204*af* and 204*ap*, respectively, in this example, such generated primary symbols and generated secondary symbols are not associated with one another because the designated location is not part of a winning primary symbol combination. Appropriate messages such as "1) YOU WIN AN AWARD BASED ON THE PRIMARY SYMBOL COMBINATION OF THREE "SPADES" ON A PAYLINE!" and "2) YOU ALSO WIN AN AWARD BASED ON THE "SPADE" PRIMARY SYMBOL BEING ASSOCIATED WITH THE BLACK SECONDARY SYMBOL AND THE "SPADE" PRIMARY SYMBOL BEING ASSOCIATED WITH THE RED SECONDARY SYMBOL BECAUSE THE PRIMARY SYMBOLS AND THE SECONDARY SYMBOLS WERE EACH GENERATED IN A DESIGNATED LOCATION AND THE PRIMARY SYMBOLS ASSOCIATED WITH THE SECONDARY SYMBOLS ARE PART OF THE WINNING PRIMARY SYMBOL COMBINATION!" may be provided to the player visually, such as in the message display 208, or through suitable audio or audiovisual displays.

In another embodiment, if the characteristics of the primary symbol do not match the characteristics of the generated secondary symbol generated in the same symbol position, then no additional award is provided to the player even if the generated primary symbol is part of a winning primary symbol combination. For example, as seen in FIG. 6, if both the SPADE primary symbol 202*am* and the red secondary symbol 204*am* are generated in the same designated location and the SPADE primary symbol 202*am* is part of a winning symbol combination, then because the color characteristic associated with the SPADE primary symbol 202*am* does not match the color characteristic associated with the red secondary symbol 204*am*, no additional award is provided to the player.

In one embodiment, the gaming device determines whether to generate zero, one or more secondary symbols if the player places a wager on the primary game. In another embodiment, the gaming device determines whether to generate zero, one or more secondary symbols if the player places a plurality of side wagers. It should be appreciated that in certain of these embodiments, even when the player places a wager to attempt to generate at least one secondary symbol, the gaming device may determine not to generate any secondary symbols.

In one embodiment, the gaming device determines whether to generate zero, one or more secondary symbols upon the occurrence of a triggering event (i.e., the occurrence of the triggering event enables the generation of zero, one or more secondary symbols). For example, the gaming device determines whether to generate zero, one or more secondary symbols if the gaming device generates a designated outcome of one or more primary symbols, such as a winning primary symbol combination. In different embodiments, the determination of whether to generate any secondary symbols is predetermined, randomly determined, determined based on the player's status (such as determined through a player tracking system), determined based on a generated symbol or symbol combination, determined based on a random determination by the central controller, determined based on a random determination at the gaming device, determined based on time (such as the time of day), determined based on an amount of coin-in accumulated in one or more pools or determined based on any other suitable method or criteria.

In one embodiment, each one of the secondary symbols are the same. In another embodiment, each one of the secondary symbols are different. In another embodiment, a plurality of the secondary symbols are different. In different embodiments, the determination of the quantity of secondary symbols to generate is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria. In different embodiments, the determination of which secondary symbols to generate is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In different embodiments, the determination of the quantity of primary symbols with at least one opening (which may display any generated secondary symbols) is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, as described above, one or more of the primary symbols each have a characteristic. In different embodiments, characteristics are displayed as a color, size, shape, number, letter, level, strength value, a category or any suitable indicia. In this embodiment, one or more of the plurality of secondary symbols also each have a characteristic. In one embodiment, if the characteristic of a generated primary symbol is associated with the characteristic of any generated secondary symbol, the gaming device determines that the primary symbol is associated with the secondary symbol and provides one or more awards based on the characteristics being associated with one another.

In one embodiment, a plurality of the secondary symbol characteristics are different. In another embodiment, a plurality of the secondary symbols are the same. In one embodiment, the gaming device includes a first type or group of at least one secondary symbol. Each secondary symbol of the first group has at least one similar characteristic. In this embodiment, the gaming device also includes a second type or group of at least one different secondary symbol. The second group of secondary symbols each have at least one different characteristic from the first group of secondary symbols. In operation of one such embodiment, generated primary symbols that are associated with the first group of generated secondary symbols, are not associated with any generated secondary symbol of the second group. For example, in one embodiment, a first group of secondary symbols are each associated with fruit characteristics. In this example, a second group of secondary symbols are each associated with number characteristics. In this example, if the gaming device generates a secondary symbol having a fruit characteristic and a primary symbol having a fruit characteristic the secondary symbol is associated with the primary symbol. On the other hand, if the gaming device generates a secondary symbol having a number characteristic and a primary symbol having a fruit characteristic, the secondary symbol is not associated with the primary symbol.

In one example embodiment, at least one of the generated primary symbols illustrates a lock symbol having a shape. In this embodiment, a plurality of the secondary symbols are each displayed as different key symbols each having a shape. In this embodiment, a plurality of the key symbols each have a different characteristic (i.e., the shape of the key) that matches or fits into (i.e., unlocks) a corresponding lock symbol. In operation of this embodiment, if the characteristic (i.e., the shape) of the generated key symbol matches the characteristic (i.e., the shape) of the generated lock symbol, the generated key symbol is associated with the generated lock symbol. In this example embodiment, additional features are made available to the player when the generated secondary key symbols match the generated primary lock symbols. The additional features include features such as one or more awards or enabling a player to participate in a bonus game.

In one embodiment, a primary symbol is associated with a secondary symbol if: (i) both the primary symbol and the secondary symbol are generated in the same designated location; and (ii) the gaming device determined to activate the secondary symbols. In one embodiment, before the gaming device generates any secondary symbols, the gaming device determines whether to activate any of the secondary symbols. In one embodiment, the gaming device generates the secondary symbols even if the secondary symbols are not activated.

In one embodiment, the gaming device activates one or more secondary symbol reels upon the player placing the wager on the primary game. In another embodiment, the player activates a secondary symbol reel by placing one or more side wagers. In one embodiment, the gaming device activates a secondary symbol reel upon the occurrence of a triggering event. In one such embodiment, a designated outcome of one or more generated primary symbols activates one or more secondary symbols. For example, if the outcome of the generated primary symbols is a winning combination of primary symbols, the gaming device activates one or more secondary symbol reels. In different embodiments, the determination of if a secondary symbol is activated is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In another example embodiment (not shown), the generated primary symbol and the generated secondary symbol are associated with one another if: (i) the generated primary symbol and the generated secondary symbol are both generated in the same designated location; and (ii) the designated location includes a predetermined secondary symbol combination. In different embodiments, the determination of if a generated primary symbol is associated with a generated secondary symbol is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one example embodiment, a plurality of generated primary symbols are displayed as card game symbols such as a spade, heart, diamond or club symbol. In this example, at least one of the card game symbols illustrates an empty diamond shaped location. The empty diamond shaped location is illustrated to receive a secondary symbol. In this example, at least one secondary symbol is displayed as a diamond. If the gaming device generates the diamond secondary symbol in the same location as the empty diamond shaped location illustrated on the card game primary symbol, then the diamond secondary symbol is associated with the card game primary symbol. On the other hand, if the gaming device generates the diamond secondary symbol, in a different location as the empty diamond shaped location, the diamond secondary symbol is not associated with the card game primary symbol.

In one embodiment, the gaming device provides different awards depending on the location of the primary symbol and secondary symbol association. For example, in one embodiment, if a primary symbol and secondary symbol association occurs on or at a first column, the gaming device provides an award of a bonus game including ten free spins of the reels. In this example embodiment, if the primary symbol and secondary symbol association occurs on a different second column, the gaming device triggers a non-free spin type bonus game. In different embodiments, the determination of which awards to provide for which locations any primary symbols are associated with any secondary symbols is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming device provides a different award based on each specific generated primary symbol and generated secondary symbol association. In one such embodiment, if an association occurs based on a generated secondary symbol having a first characteristic matching a generated primary symbol having the first characteristic, the gaming device activates the primary symbol as a wild symbol. In this embodiment, if an association occurs based on a generated secondary symbol having a second characteristic matching a generated primary symbol having the second characteristic, the gaming device triggers a bonus event. In an alternative embodiment, the gaming device provides the same award for each specific generated primary symbol and generated secondary symbol association. In another embodiment, a quantity of free spins or free activations (which are provided as a bonus game) is based on the generated primary symbol combination. For example, if a winning primary symbol combination is associated with fifteen credits and at least one of the primary symbols of the winning primary symbol combination is associated with a generated secondary symbol, the gaming device provides the player a bonus game including fifteen free spins or free activations.

In one embodiment, the gaming device provides a different award based on combinations of primary symbol and secondary symbol associations. In one example embodiment, the gaming device generates three primary symbol and secondary symbol associations. In this example, the gaming device provides an award of extra paylines for such a generation of associations. In this example if the gaming device generates five primary symbol and secondary symbol associations, the gaming device provides an award of extra wild symbols.

In different embodiments, the bonus games which are triggered if one or more primary symbols are associated with one or more secondary symbols may incorporate any of the types of games described herein, as well as any suitable puzzle-type game, any suitable free spin or free activation type game; any suitable persistence game, any suitable wheel game, any suitable selection game, any suitable offer and acceptance game, any suitable cascading symbols game, any suitable ways to win game, any suitable scatter pay game, any suitable group game or any other suitable type of game.

In another embodiment, a plurality of generated secondary symbols are associated with a plurality of designated primary symbols. In one embodiment, the gaming device provides an award based on the amount or quantity of generated primary symbol and generated secondary symbol combinations. For example, if the gaming device generates one primary symbol and secondary symbol association, the gaming machine provides the player an award of ten credits. In this example, if the gaming device generates five primary symbol and secondary symbol associations, the gaming device provides the player an award of five hundred credits. In one embodiment, the gaming machine tracks the generated primary symbol and secondary symbol associations from previous game plays to determine the total amount of generated primary symbol and secondary symbol associations in the current game play.

In another embodiment, if a primary symbol is generated in association with a secondary symbol, the gaming device activates the primary symbol as a wild symbol. In this embodiment, the gaming device determines if any additional winning primary symbol combinations occur with respect to the generated wild symbol. In different embodiments, the determination of the number of plays the primary symbol is activated as a wild symbol is predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In different embodiments, the awards available to be provided to the player if a generated primary symbol is associated with a generated secondary symbol include, but are not limited to: a quantity of free spins of one or more games; a quantity of free activations of one or more games; an applicable multiplier for at least one, a credit amount (based on a triggering event and/or a wager placed); a quantity of picks in the game; a quantity of selections in the game; a quantity of wild symbols in the game; a quantity of retrigger symbols in the game; a quantity of terminators or termination symbols in the game; a quantity of anti-terminators in the game; a quantity of locking reels in the game; a quantity of locking symbol positions in the game; a quantity of expanding symbols in the game; a quantity of rounds or levels in the game; a quantity of award opportunities in the game; a quantity of progressive awards in the game; a range of available awards in the game; a quantity of active reels in the game; a quantity of active paylines in the game; a quantity of offers in the game; a paytable which will be utilized in the game; a quantity of hands of playing cards in the game; any combination thereof; and any other suitable award.

In another embodiment, if a primary symbol is generated in association with a secondary symbol, each of the symbols remain in their symbol location for one or more plays of the game. In other words, the gaming device does not regenerate the symbols located where the primary symbol and the secondary symbol are associated with one another for at least the next game play. In this embodiment, the gaming device provides any award to the player based on the accumulated quantity of primary symbol and secondary symbol associations accumulated for more than one game play. In this embodiment, the accumulated associations causes an increase in the likelihood of the gaming device providing awards associated with higher quantities of associations. In one example, a primary symbol combination triggers a bonus event and rewards the player with ten free spins or free activations as a bonus game. In this example, during the ten free spins, if the gaming device generates a primary symbol associated with a secondary symbol, the primary symbol and the secondary symbol remain in their respective symbol locations during the remaining free spins. In this example, the primary symbol and secondary symbol associations accumulate during the free spins and enable the player to receive additional awards associated with higher quantities of associations.

In different embodiments, the determination of the number of free spins or free activations provided as the bonus game and/or the number of the symbols remaining in their symbol locations are predetermined, randomly determined, determined based on the player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day), determined based on an amount of coin-in accumulated in one or more pools or determined based on any other suitable method or criteria.

In one embodiment, the plurality of reels 54 includes at least one concentric reel including a primary symbol reel and a secondary symbol reel. In this embodiment, the primary symbol reel includes one or more primary symbols such as a cherry symbol, a bell symbol, a seven symbol, a key symbol, a money bag symbol or money symbol, and an orange symbol and at least one viewable area or window. In one embodiment, the secondary symbol reel includes one or more secondary symbols. The viewable area of the primary symbol reel enables a player to view one or more of the secondary symbols of the secondary symbol reel through the primary symbol reel. The viewable area or window is cut out or otherwise suitably defined by the primary symbol reel. In another embodiment, a see-through material, such as glass or a clear plastic, is positioned in an opening in the primary symbol reel and attached to the primary symbol reel to form the window and enable a player to see through the window. It should be appreciated that any suitable material may be used to form the window. It should also be appreciated that the window may be any suitable size or shape. In another embodiment, the primary symbol reel includes a plurality of the viewable areas or windows.

In one embodiment, the secondary symbols from the secondary symbol reel overlay the primary symbols of the primary reel. That is, when the gaming device generates a secondary symbol and a primary symbol in the same symbol location, the player is able to view the generated secondary symbol as well as the generated primary symbol. Examples of different methods of displaying such secondary symbols are disclosed in U.S. Pat. No. 7,255,643; WO99/44095; WO01/09664; WO01/15127; WO01/15128; WO01/15132; WO2004/102520; and WO2006/038819.

Figure 7:
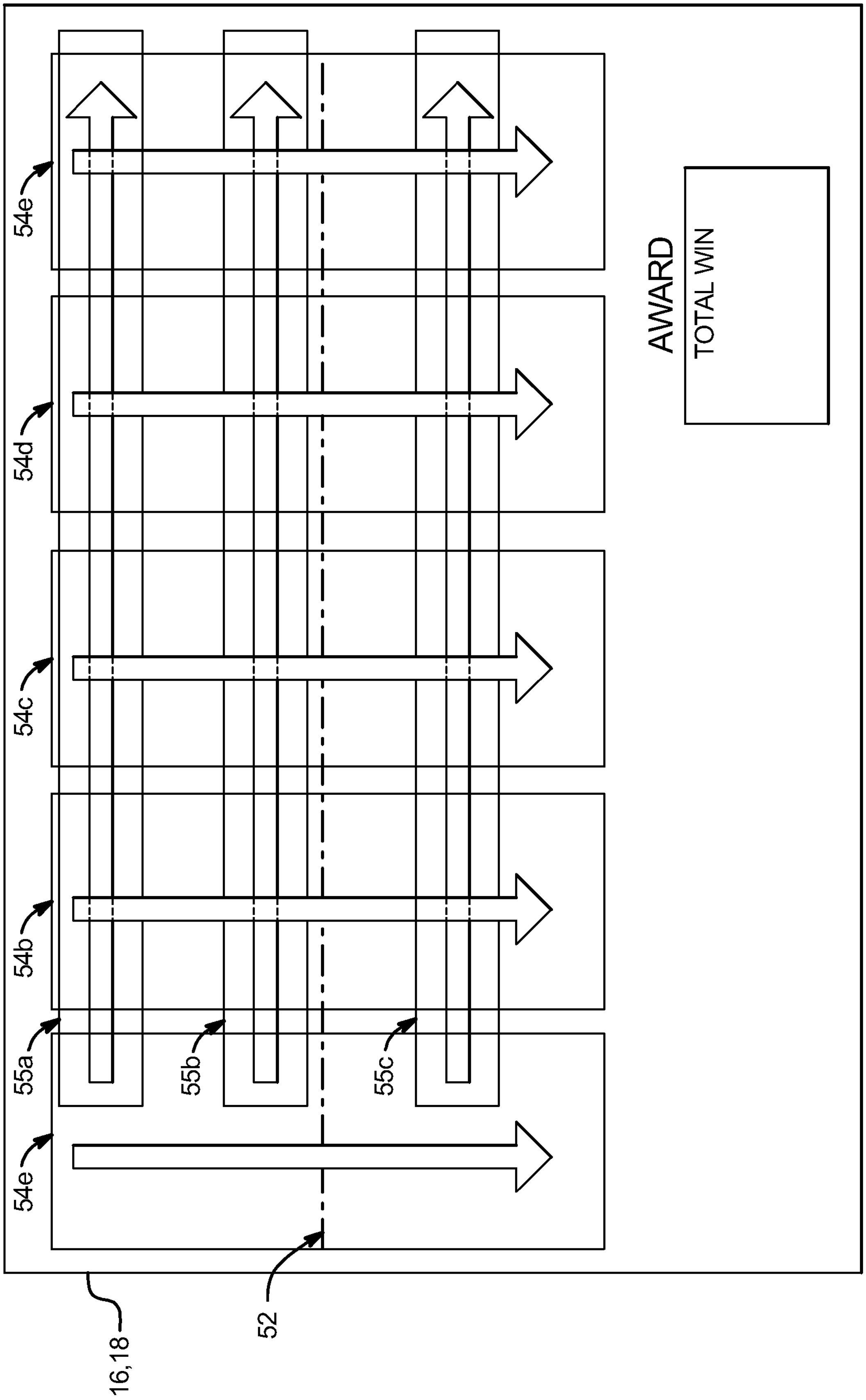
FIG. 7 is a front view of one embodiment of the secondary symbol reels configured perpendicular to the primary symbol reels.

In one embodiment, the primary reels are configured perpendicular to the secondary reels. Referring to FIG. 7, in this example, the primary symbol reels 54*a* through 54*e* are configured perpendicular to the secondary symbol reels 55*a*, 55*b* and 55*c*. The secondary symbols are generated perpendicular to the primary symbols, as indicated by the arrows. In this example, the primary symbols move from up to down, across the display 16 or 18. The secondary symbols move from left to right, across the display 16 or 18.

In different embodiments, the gaming device generates the secondary symbols before or at the same time as the primary symbols. In one embodiment, the primary symbols are generated simultaneously with the secondary symbols. In one embodiment, the primary symbols stop before the secondary symbols stop. In one embodiment, the secondary symbols stop before the primary symbols. In one such embodiment, the secondary symbols stop spinning one second after the regular symbols stop.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
a housing;
at least one display device supported by the housing;
a plurality of input devices supported by the housing, said plurality of input devices including:
(i) a payment acceptor, and
(ii) a cashout device;
at least one processor; and
at least one memory device which stores a plurality of instructions, which when executed by the at least one processor, cause the at least one processor to operate with the at least one display device and the plurality of input devices to:
(a) if a physical item is received via the payment acceptor, establish a credit balance based, at least in part, on a monetary value associated with the received physical item, wherein said physical item is selected from the group consisting of: a ticket associated with the monetary value and a unit of currency;
(b) for a play of a game:
(i) randomly determine a plurality of primary symbols upon a wager by a player;
(ii) display, via the at least one display device, the randomly determined plurality of primary symbols;
(iii) separate from the determination and display of the primary symbols, determine whether to display a plurality of separate secondary symbols;
(iv) if the determination is to display a plurality of separate secondary symbols:

(A) separate from the determination and display of the primary symbols:

(I) additionally randomly determine a plurality of separate secondary symbols, and (II) display, via the at least one display device, the additionally randomly determined plurality of secondary symbols, and (B) if a plurality of the displayed primary symbols form a winning primary symbol combination:

(I) display an award associated with the formed winning primary symbol combination, wherein said credit balance is increasable based on the award associated with the formed winning primary symbol combination, and (II) if a designated number of the displayed primary symbols which form the winning primary symbol combination are each associated with one of the displayed secondary symbols, display an additional award, wherein said designated number is at least two, said additional award is based on both at least one of the displayed primary symbols and at least one of the displayed secondary symbols, and said credit balance is increasable based on the additional award;

(v) if the determination is to not display at least one separate secondary symbol and the plurality of the displayed primary symbols form the winning primary symbol combination, display the award associated with the formed winning primary symbol combination, wherein said credit balance is increasable based on the award associated with the formed winning primary symbol combination; and (c) if a cashout input is received via the cashout device, cause an initiation of any payout associated with the credit balance.

2. The gaming system of claim 1, wherein when executed by the at least one processor, the plurality of instructions cause the at least one processor to determine whether to display a plurality of separate secondary symbols based on if the player places a side wager.

3. The gaming system of claim 1, wherein one of the displayed primary symbols which forms part of the winning primary symbol combination is associated with one of the displayed secondary symbols if said displayed primary symbol and said displayed secondary symbol are each displayed in a designated symbol position.

4. The gaming system of claim 1, wherein the additional award is a triggering of at least one bonus event.

5. The gaming system of claim 1, wherein a plurality of the separate secondary symbols are different.

6. The gaming system of claim 1, wherein when executed by the at least one processor, the plurality of instructions cause the at least one processor to display the plurality of separate randomly generated secondary symbols after the determination and display of the plurality of primary symbols if the determination is to display a plurality of separate secondary symbols.

7. The gaming system of claim 1, wherein the additional award is based, at least in part, on a quantity of primary symbols which form the winning primary symbol combination that are each associated with one of the displayed secondary symbols.

8. A gaming system comprising:

a housing;

at least one display device supported by the housing;

a plurality of input devices supported by the housing, said plurality of input devices including:

(i) a payment acceptor, and (ii) a cashout device;

at least one processor; and at least one memory device which stores a plurality of instructions, which when executed by the at least one processor, cause the at least one processor to operate with the at least one display device and the plurality of input devices to:

(a) if a physical item is received via the payment acceptor, establish a credit balance based, at least in part, on a monetary value associated with the received physical item, wherein said physical item is selected from the group consisting of: a ticket associated with the monetary value and a unit of currency;

(b) for a play of a game:

(i) randomly determine a plurality of primary symbols;

(ii) display, via the at least one display device, the randomly determined plurality of primary symbols;

(iii) separate from the determination and display of the primary symbols:

(A) additionally randomly determine a plurality of separate secondary symbols, and (B) display, via the at least one display device, the additionally randomly determined plurality of separate secondary symbols; and (iv) if a plurality of the displayed primary symbols form a winning primary symbol combination:

(A) display an award associated with the formed winning primary symbol combination, wherein the credit balance is increasable based on the award associated with the formed winning primary symbol combination, and (B) if a designated number of the displayed primary symbols which form the winning primary symbol combination are each associated with one of the displayed secondary symbols, display an additional award, wherein said designated number is at least two, said additional award is based on both at least one of the displayed primary symbols and at least one of the displayed secondary symbols, and the credit balance is increasable based on the additional award; and (c) if a cashout input is received via the cashout device, cause an initiation of any payout associated with the credit balance.

9. The gaming system of claim 8, wherein one of the displayed primary symbols which forms part of the winning primary symbol combination is associated with one of the displayed secondary symbols if said displayed primary symbol and said displayed secondary symbol are each displayed in a designated symbol position.

10. The gaming system of claim 8, wherein the additional award is a triggering of at least one bonus event.

11. The gaming system of claim 8, wherein when executed by the at least one processor, the plurality of instructions cause the at least one processor to display a plurality of separate secondary symbols after the determination and display of the plurality of primary symbols.

12. The gaming system of claim 8, wherein the additional award is based, at least in part, on a quantity of primary symbols which form the winning primary symbol combination that are each associated with one of the displayed secondary symbols.

* * * * *